(12) United States Patent
Marshall

(10) Patent No.: US 9,195,811 B2
(45) Date of Patent: *Nov. 24, 2015

(54) FUNCTIONALITY WATERMARKING AND MANAGEMENT

(71) Applicant: Sky Socket, LLC, Atlanta, GA (US)

(72) Inventor: John Marshall, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,586

(22) Filed: Dec. 27, 2013

(65) Prior Publication Data

US 2014/0108809 A1  Apr. 17, 2014

Related U.S. Application Data

(63) Continuation of application No. 13/934,386, filed on Jul. 3, 2013.

(51) Int. Cl.
| | |
|---|---|
| *H04L 29/06* | (2006.01) |
| *G06F 21/16* | (2013.01) |
| *G06F 21/00* | (2013.01) |
| *G06F 21/30* | (2013.01) |
| *G06F 21/62* | (2013.01) |

(52) U.S. Cl.
CPC ............... *G06F 21/16* (2013.01); *G06F 21/00* (2013.01); *G06F 21/30* (2013.01); *G06F 21/629* (2013.01); *G06F 21/6227* (2013.01)

(58) Field of Classification Search
CPC .............................. G06F 21/16; G06F 21/6227
USPC ......................................................... 713/176
See application file for complete search history.

(56) References Cited

U.S. PATENT DOCUMENTS

| | | | |
|---|---|---|---|
| 4,679,226 | A | 7/1987 | Muehleisen |
| 5,237,614 | A | 8/1993 | Weiss |
| 5,446,888 | A | 8/1995 | Pyne |
| 5,574,786 | A | 11/1996 | Dayan et al. |
| 5,625,869 | A | 4/1997 | Nagamatsu et al. |
| 5,631,947 | A | 5/1997 | Wittstein et al. |
| 5,799,068 | A | 8/1998 | Kikinis et al. |
| 5,826,265 | A | 10/1998 | Van Huben et al. |
| 5,864,683 | A | 1/1999 | Boebert et al. |

(Continued)

FOREIGN PATENT DOCUMENTS

| | | |
|---|---|---|
| CA | 2149337 A1 | 6/1994 |
| GB | 2309860 B | 5/2000 |

(Continued)

OTHER PUBLICATIONS

Asynchrony Software, Inc., , "PDA Defense User Guide", 2002.

(Continued)

*Primary Examiner* — Longbit Chai
(74) *Attorney, Agent, or Firm* — Thomas | Horstemeyer, LLP

(57) ABSTRACT

A method, system and non-transitory computer-readable medium product are provided for functionality watermarking and management. In the context of a method, a method is provided that includes identifying a request to perform at least one function of a user device and identifying at least one watermark template. The method further includes applying the at least one watermark template to at least one function of the user device and authorizing the request to perform the at least one function of the user device.

20 Claims, 3 Drawing Sheets

(56) References Cited

U.S. PATENT DOCUMENTS

| | | |
|---|---|---|
| 5,870,459 A | 2/1999 | Phillips et al. |
| 5,928,329 A | 7/1999 | Clark et al. |
| 5,961,590 A | 10/1999 | Mendez et al. |
| 5,966,081 A | 10/1999 | Chesnutt |
| 5,974,238 A | 10/1999 | Chase, Jr. |
| 5,987,609 A | 11/1999 | Hasebe |
| 6,006,332 A | 12/1999 | Rabne et al. |
| 6,021,492 A | 2/2000 | May |
| 6,023,708 A | 2/2000 | Mendez et al. |
| 6,085,192 A | 7/2000 | Mendez et al. |
| 6,131,096 A | 10/2000 | Ng et al. |
| 6,131,116 A | 10/2000 | Riggins et al. |
| 6,151,606 A | 11/2000 | Mendez |
| 6,167,253 A | 12/2000 | Farris et al. |
| 6,233,341 B1 | 5/2001 | Riggins |
| 6,269,369 B1 | 7/2001 | Robertson |
| 6,463,470 B1 | 10/2002 | Mohaban et al. |
| 6,480,096 B1 | 11/2002 | Gutman et al. |
| 6,560,772 B1 | 5/2003 | Slinger |
| 6,606,662 B2 | 8/2003 | Nagasaki |
| 6,636,489 B1 | 10/2003 | Fingerhut |
| 6,668,322 B1 | 12/2003 | Wood et al. |
| 6,708,221 B1 | 3/2004 | Mendez et al. |
| 6,714,859 B2 | 3/2004 | Jones |
| 6,726,106 B1 | 4/2004 | Han et al. |
| 6,727,856 B1 | 4/2004 | Hill |
| 6,741,232 B1 | 5/2004 | Siedlikowski et al. |
| 6,741,927 B2 | 5/2004 | Jones |
| 6,766,454 B1 | 7/2004 | Riggins |
| 6,779,118 B1 | 8/2004 | Ikudome et al. |
| 6,904,359 B2 | 6/2005 | Jones |
| 6,965,876 B2 | 11/2005 | Dabbiere |
| 6,995,749 B2 | 2/2006 | Friend |
| 7,017,105 B2 | 3/2006 | Flanagin et al. |
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,688 B2 | 6/2006 | Collins et al. |
| 7,092,943 B2 | 8/2006 | Roese et al. |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B1 | 5/2008 | Riggins |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,480,907 B1 | 1/2009 | Marolia et al. |
| 7,496,847 B2 | 2/2009 | Koehane et al. |
| 7,496,957 B2 | 2/2009 | Howard et al. |
| 7,539,665 B2 | 5/2009 | Mendez |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B1 | 4/2010 | Maurya et al. |
| 7,702,785 B2 | 4/2010 | Bruton, III et al. |
| 7,735,112 B2 | 6/2010 | Kim et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,873,959 B2 | 1/2011 | Zhu et al. |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,970,386 B2 | 6/2011 | Bhat et al. |
| 8,001,082 B1 | 8/2011 | Muratov |
| 8,012,219 B2 | 9/2011 | Mendez et al. |
| 8,041,776 B2 | 10/2011 | Friedman et al. |
| 8,046,823 B1 | 10/2011 | Begen et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,099,332 B2 | 1/2012 | Lemay et al. |
| 8,117,344 B2 | 2/2012 | Mendez et al. |
| 8,150,431 B2 | 4/2012 | Wolovitz et al. |
| 8,166,106 B2 | 4/2012 | Biggs et al. |
| 8,225,381 B2 | 7/2012 | Lemke |
| 8,351,589 B2 * | 1/2013 | Acero et al. ............. 379/202.01 |
| 8,359,016 B2 | 1/2013 | Lindeman et al. |
| 8,433,620 B2 | 4/2013 | Futty et al. |
| 8,504,831 B2 | 8/2013 | Pratt et al. |
| 8,613,048 B2 | 12/2013 | Braddy et al. |
| 2001/0023421 A1 | 9/2001 | Numao et al. |
| 2002/0013721 A1 | 1/2002 | Dabbiere et al. |
| 2002/0049644 A1 | 4/2002 | Kargman |
| 2002/0055967 A1 | 5/2002 | Coussement |
| 2002/0098840 A1 | 7/2002 | Hanson et al. |
| 2003/0065934 A1 | 4/2003 | Angelo et al. |
| 2003/0110084 A1 | 6/2003 | Eberhard et al. |
| 2003/0164852 A1 | 9/2003 | Simpson et al. |
| 2003/0172166 A1 | 9/2003 | Judge et al. |
| 2003/0186689 A1 | 10/2003 | Herle et al. |
| 2003/0187798 A1 * | 10/2003 | McKinley et al. ............... 705/50 |
| 2003/0204716 A1 | 10/2003 | Rockwood et al. |
| 2004/0098715 A1 | 5/2004 | Aghera et al. |
| 2004/0123153 A1 | 6/2004 | Wright et al. |
| 2004/0181687 A1 | 9/2004 | Nachenberg et al. |
| 2004/0224703 A1 | 11/2004 | Takaki et al. |
| 2005/0003804 A1 | 1/2005 | Huomo et al. |
| 2005/0021980 A1 | 1/2005 | Kanai |
| 2005/0071748 A1 | 3/2005 | Shipp |
| 2005/0246192 A1 | 11/2005 | Jauffred et al. |
| 2006/0041502 A1 | 2/2006 | Blair et al. |
| 2006/0190984 A1 | 8/2006 | Heard et al. |
| 2006/0203815 A1 | 9/2006 | Couillard |
| 2007/0016613 A1 | 1/2007 | Foresti et al. |
| 2007/0033397 A1 | 2/2007 | Phillips, II et al. |
| 2007/0093243 A1 | 4/2007 | Kapadekar et al. |
| 2007/0136492 A1 | 6/2007 | Blum et al. |
| 2007/0143603 A1 * | 6/2007 | Hadden et al. ................. 713/167 |
| 2007/0156897 A1 | 7/2007 | Lim |
| 2007/0174433 A1 | 7/2007 | Mendez et al. |
| 2007/0192588 A1 | 8/2007 | Roskind et al. |
| 2007/0260883 A1 | 11/2007 | Giobbi et al. |
| 2007/0261099 A1 | 11/2007 | Broussard et al. |
| 2007/0288637 A1 | 12/2007 | Layton et al. |
| 2008/0002854 A1 | 1/2008 | Tehranchi et al. |
| 2008/0051076 A1 | 2/2008 | O'Shaughnessy et al. |
| 2008/0133712 A1 | 6/2008 | Friedman et al. |
| 2008/0134305 A1 | 6/2008 | Hinton et al. |
| 2008/0134347 A1 | 6/2008 | Goyal et al. |
| 2008/0201453 A1 | 8/2008 | Assenmacher |
| 2008/0244695 A1 | 10/2008 | Lee et al. |
| 2009/0036111 A1 | 2/2009 | Danford et al. |
| 2009/0144632 A1 | 6/2009 | Mendez |
| 2009/0198997 A1 | 8/2009 | Yeap et al. |
| 2009/0253410 A1 | 10/2009 | Fitzgerald et al. |
| 2009/0260064 A1 | 10/2009 | McDowell et al. |

(56) References Cited

U.S. PATENT DOCUMENTS

| | | |
|---|---|---|
| 2009/0300739 A1 | 12/2009 | Nice et al. |
| 2009/0307362 A1 | 12/2009 | Mendez et al. |
| 2010/0005125 A1 | 1/2010 | Mendez et al. |
| 2010/0005157 A1 | 1/2010 | Mendez et al. |
| 2010/0005159 A1 | 1/2010 | Ishiguro |
| 2010/0005195 A1 | 1/2010 | Mendez et al. |
| 2010/0023630 A1 | 1/2010 | Mendez et al. |
| 2010/0100641 A1 | 4/2010 | Quinlan et al. |
| 2010/0120450 A1 | 5/2010 | Herz |
| 2010/0144323 A1 | 6/2010 | Collins et al. |
| 2010/0146269 A1 | 6/2010 | Baskaran |
| 2010/0254410 A1 | 10/2010 | Collins |
| 2010/0268844 A1 | 10/2010 | Quinlan et al. |
| 2010/0273456 A1 | 10/2010 | Wolovitz et al. |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2011/0004941 A1 | 1/2011 | Mendez et al. |
| 2011/0082900 A1 | 4/2011 | Nagpal et al. |
| 2011/0113062 A1 | 5/2011 | Quinlan et al. |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0179352 A1 | 7/2011 | Treadwell et al. |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0314550 A1 | 12/2011 | Mastrangelo et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0045089 A1 | 2/2012 | Ramos et al. |
| 2012/0072729 A1 | 3/2012 | Winograd et al. |
| 2012/0072730 A1 | 3/2012 | Winograd et al. |
| 2012/0102392 A1 | 4/2012 | Reesman et al. |
| 2012/0198547 A1 | 8/2012 | Fredette et al. |
| 2012/0204032 A1 | 8/2012 | Wilkins et al. |
| 2013/0061307 A1 | 3/2013 | Livne |
| 2013/0086466 A1 | 4/2013 | Levy et al. |
| 2013/0125196 A1 | 5/2013 | Shapiro |
| 2013/0152169 A1 | 6/2013 | Stuntebeck |
| 2013/0152210 A1 | 6/2013 | Petrovic et al. |
| 2013/0198038 A1 | 8/2013 | Mowatt et al. |
| 2013/0222836 A1 | 8/2013 | Kakegawa |
| 2013/0276062 A1 | 10/2013 | Sarawat et al. |
| 2014/0007246 A1 | 1/2014 | Nelson et al. |

FOREIGN PATENT DOCUMENTS

| | | |
|---|---|---|
| GB | 2346716 A | 8/2000 |
| JP | 07141245 A | 6/1995 |
| JP | 08251660 A | 9/1996 |
| WO | 9704389 A1 | 2/1997 |
| WO | 9922322 A1 | 5/1999 |
| WO | 0241661 A2 | 5/2002 |

OTHER PUBLICATIONS

Belani, Eshwar et al., "The Crisis Wide Area Security Architecture", 1998.

Benaloh, Josh et al., "Patient Controlled Encryption: Ensuring Privacy of Electronic Medical Records", Nov. 13, 2009.

Do, Khang D. , "NFOA in U.S. Appl. No. 13/316,073", Non-Final Office Action Cited in U.S. Appl. No. 13/316,073 dated Jan. 18, 2013, Jan. 18, 2013,.

Fox, Armando et al., "Security on the Move: Indirect Authentication Using Kerberos", 1996.

Gong, Li et al., "Multicast Security and Its Extension to a Mobile Environment", Oct. 1995.

Infinite Technologies, , "Infinite Interchange", 1997.

Kiiskinen, Jani et al., "Data Channel Service for Wireless Telephone Links", Jan. 1996.

Latedroid, , "JuiceDefender", Jan. 15, 2012.

Menaria, Pankaj et al., "Security in Mobile Database Systems", Mar. 17, 2011.

Nokia, , "Nokia 9000i Owner's Manual", 1997.

Pfitzmann, Andreas et al., "Mobile User Devices and Security Modules: Design for Trustworthiness", Feb. 5, 1996.

Ratner, David et al., "Replication Requirements in Mobile Environments", Nov. 2001.

Ratner, David H. , "Roam: A scalable Replication System for Mobile and Distributed Computing", Jan. 1998.

Research in Motion, , "Blackberry Wireless Handheld 5810 Getting Started Guide", Jan. 15, 2003.

Research in Motion, , "Blackberry Wireless Handheld 5810 Quick Reference Guide", 2003.

Research in Motion, "Blackberry Wireless Handheld 5810 User Guide", 2003.

Stajano, Frank et al., "The Thinnest of Clients: Controlling It All Via Cellphone", Mobile Computing and Communications Review, vol. 2, No. 4, Oct. 1998.

Steiner, Jennifer , "Kerberos: An Authentication Service for Open Network Systems", Jan. 12, 1988.

Strunk, John et al., "Self-Securing Storage: Protecting Data in Compromised Systems", Symposium on Operating Systems Design and Implementation, 2000.

Sybase, , "MobiLink Synchronization User's Guide", Part No. 38132-01-0800-01, Nov. 2001.

Symantec Corporation, , "Creating Norton pcAnywhere Scripts", 1994.

Traveling Software, Inc., , "LapLink for Windows 95", 1996.

Wachowicz, Moniza et al., "Combining Location and Data Management in an Environment for Total Mobility", In Proceedings of the International Workshop on Information Visualization and Mobile Computing, 1996.

Xcellenet, Inc., , "RemoteWare Client for Windows NT and Windows 95 User's Guide", 1996.

Xcellenet, Inc., , "RemoteWare Forms and RemoteWare Query", 1994.

Xcellenet, Inc., , "RemoteWare Forms Getting Started Guide", 1994.

Xcellenet, Inc., , "RemoteWare Server for Windows NT", 1996.

Xcellenet, Inc., , "RemoteWare Server Operations Guide", 1992.

Asynchrony Software, Inc., , "PDA Defense User Guide", 726, 2002.

Belani, Eshwar et al., "The Crisis Wide Area Security Architecture", 726, 1998.

Benaloh, Josh et al., "Patient Controlled Encryption: Ensuring Privacy of Electronic Medical Records", 726, Nov. 13, 2009.

Fox, Armando et al., "Security on the Move: Indirect Authentication Using Kerberos", 726, 1996.

Menaria, Pankaj et al., "Security in Mobile Database Systems", 707, 726, Mar. 17, 2011.

Pfitzmann, Andreas et al., "Mobile User Devices and Security Modules: Design for Trustworthiness", 726, Feb. 5, 1996.

Steiner, Jennifer , "Kerberos: An Authentication Service for Open Network Systems", 726, Jan. 12, 1988.

Strunk, John et al., "Self-Securing Storage: Protecting Data in Compromised Systems", Symposium on Operating Systems Design and Implementation, 726, 2000.

Non-Final Office Action mailed Nov. 17, 2014 for U.S. Appl. No. 13/907,930.

Non-Final Office Action mailed Dec. 10, 2014 for U.S. Appl. No. 13/907,932.

Non-Final Office Action mailed Mar. 24, 2015 for U.S. Appl. No. 14/181,993.

Office Action mailed Apr. 8, 2015 for U.S. Appl. No. 13/967,947.

Office Action mailed Apr. 28, 2015 for U.S. Appl. No. 13/907,930.

* cited by examiner

US 9,195,811 B2

FUNCTIONALITY WATERMARKING AND MANAGEMENT

CROSS-REFERENCE TO RELATED APPLICATIONS

This application is a continuation of U.S. patent application Ser. No. 13/934,386 filed Jul. 3, 2013, entitled "FUNCTIONALITY WATERMARKING AND MANAGEMENT," now issued as U.S. Pat. No. 8,756,426, the entire disclosure of which is hereby incorporated by reference, for all purposes, as if fully set forth herein.

BACKGROUND

Functionality Watermarking and Management provides applying watermark templates to functions performed on a user device. Additionally, watermarked resource management provides logging events related to watermark template applications and function request authorizations. In some situations, user devices may seek to perform functions that are not watermarked, which may be problematic as certain functions are sensitive and must not be freely utilized. Conventional approaches address this problem by relying on the user of a user device to manually watermark functions upon performing the functions.

SUMMARY

This Summary is provided to introduce a selection of concepts in a simplified form that are further described below in the Detailed Description. This Summary is neither intended to identify key features or essential features of the claimed subject matter, nor is this Summary intended to limit the claimed subject matter's scope.

A method, apparatus and non-transitory computer-readable medium product are provided for functionality watermarking and management. In the context of a method, a method is provided that includes identifying a request to perform at least one function of a user device and identifying at least one watermark template. The method further includes applying the at least one watermark template to the at least one function of the user device and authorizing the request to perform the at least one function of the user device.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
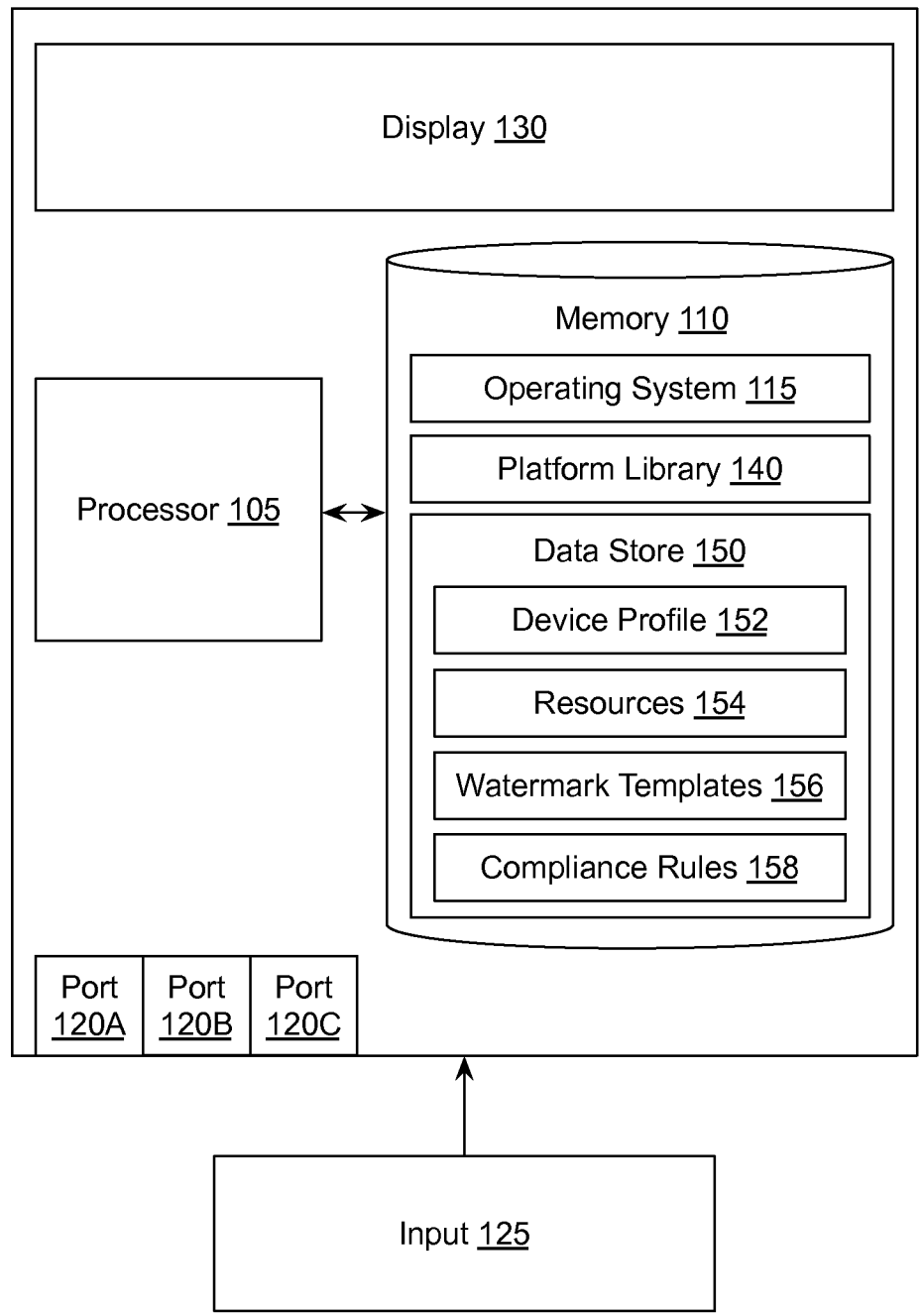
FIG. 1 is a block diagram of a user device.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Functionality watermarking and management may be provided. Functions of user devices may include, but are not limited to, hardware functions such as camera functions, software functions such as voice activated functions, and application functions such as containerized document access and/or annotation functions. Information Technology (IT) administrators may secure functions performed by user devices by configuring compliance rules that require that watermark templates are applied to the functions before and/or during performance of the functions. Watermark templates may describe the functions of the user devices, such as identifying the functions as sensitive. Watermark templates may, for instance, specify user information, device information, environmental information, and enterprise information such that functions of user devices associated with the watermark templates are identified as being associated with such user information, device information, environmental information, and enterprise information. In particular, watermark templates may include statements indicating the identities of users of user devices that have performed functions, the state of security settings on user devices that have performed functions, the time and location associated user devices that have performed functions, the ownership by an enterprise of resources accessed by performed functions, and/or the like. Watermark templates may also specify the manner in which the user devices must perform the functions of the user devices. In particular, watermark templates may configure a function of a user device such that any resources accessed by the function are named according to a naming convention specified by the watermark templates and are stored according to a storage structure convention specified by the watermark templates.

This process may be implemented through a method that identifies requests to perform functions of user devices, identifies watermark templates, associates the watermark templates with the functions, and authorizes the user devices to perform the functions. As an example, an administrator may configure a compliance rule that specifies that a certain user device may only use a camera function of the user device while all a certain watermark template is associated with the camera function of the user device. The user device may, for instance, enforce such a configured compliance rule by identifying requests to use the camera function of the user device, identifying the certain watermark template, overlaying the identified watermark template onto a graphical interface associated with the camera function of the user device such that an observer of the camera function would identify the camera function as being related to the watermark template and/or information contained therein, and authorizing the request to perform the camera function. Additionally, the user device may add the identified watermark template to any photo and/or video resources captured by the camera function during performance of the camera function by the user device, such that an observer of the photo and/or video resources would identify the photo and/or video resources as being related to the watermark template and/or information contained therein.

The method may further include steps to facilitate managing user devices that are subject to the method. In certain embodiments, the method may include a step that creates an event log that describes actions taken with respect to the functions of the user devices, resources accessible to the functions of the user devices, and the user devices themselves. In particular, an event log may be created that describes the association of the watermark template with the function of the user device and/or the authorization of the request to perform the functions of the user device. Additionally, in some embodiments, the method may include a step that transmits the event log to a service communicatively coupled to the user device, which may include an enterprise mobility management service, a mobile device management service, a mobile content management service, a mobile application management service, and/or a mobile email management service.

The method may yet further include denying the request to perform the functions of the user devices if the user devices do not comply with additional compliance rules, which may be unrelated to requiring that watermark templates are associated with functions of user devices before the user devices are authorized to perform such functions. Common examples of additional compliance rules may include determining whether the user device is hacked, jail broken and/or compromised, determining whether the user device has any prohibited applications installed, determining whether the user of the user device has set a password with the appropriate length, determining whether the user device is located within an authorized geographic location, determining whether a time associated with the user device is within an authorized duration, etc.

FIG. 1 is a block diagram of a user device 100. User device 100 may comprise a processor 105 and a memory 110. For example, user device 100 may comprise a personal digital assistant, a smart phone, a cellular telephone, a desktop computer, a laptop computer, a set-top box, a music player, a web pad, a tablet computer system, a game console, and/or any other device with like capability. Depending on the configuration and type of device, memory 110 may comprise, but is not limited to, volatile (e.g. random access memory (RAM)), non-volatile (e.g. read-only memory (ROM)), flash memory, or any combination. Memory 110 may store executable programs and related data components of various applications and modules for execution by user device 100. Memory 110 may be coupled to processor 105 for storing configuration data and operational parameters, such as commands that are recognized by processor 105.

Basic functionality of user device 100 may be provided by an operating system 115 contained in memory 100. One or more programmed software applications may be executed by utilizing the computing resources in user device 100. Applications stored in memory 110 may be executed by processor 105 (e.g., a central processing unit or digital signal processor) under the auspices of operating system 115. For example, processor 105 may be configured to execute applications such as web browsing applications, email applications, instant messaging applications, and/or other applications capable of receiving and/or providing data.

Data provided as input to and generated as output from the application(s) may be stored in memory 110 and read by processor 105 from memory 110 as needed during the course of application program execution. Input data may be data stored in memory 110 by a secondary application or other source, either internal or external to user device 100, or possibly anticipated by the application and thus created with the application program at the time it was generated as a software application program. Data may be received via any of a plurality of communication ports 120(A)-(C) of user device 100. Communication ports 120(A)-(C) may allow user device 100 to communicate with other devices, and may comprise components such as an Ethernet network adapter, a modem, and/or a wireless network connectivity interface. For example, the wireless network connectivity interface may comprise at least one of a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like.

User device 100 may also receive data as user input via an input component 125, such as a keyboard, a mouse, a pen, a stylus, a sound input device, a touch input device, a capture device, etc. A capture device may be operative to record user(s) and capture spoken words, motions and/or gestures, such as with a camera and/or microphone. The capture device may comprise any speech and/or motion detection device capable of detecting the speech and/or actions of the user(s).

Data generated by applications may be stored in memory 110 by the processor 105 during the course of application program execution. Data may be provided to the user during application program execution by means of a display 130. Consistent with embodiments of this disclosure, display 130 may comprise an integrated display screen and/or an output port coupled to an external display screen.

Memory 110 may also comprise a platform library 140. Platform library 140 may comprise a collection of functionality useful to multiple applications, such as may be provided by an application programming interface (API) to a software development kit (SDK). These utilities may be accessed by applications as necessary so that each application does not have to contain these utilities thus allowing for memory consumption savings and a consistent user interface.

Memory 110 may further comprise a data store 150, within which user device 100 may store a plurality of user device 100 files. User device 100 may, for instance, store in the data store 150 a device profile 152. Device profile 152 may comprise one or more indications of the state of user device 100. For instance, device profile 152 may represent device identifiers unique to user device 100, user identifiers and/or credentials associated with one or more users of user device 100, hardware features and/or components of user device 100, version and configuration information of various software features and applications installed on user device 100, data transmission protocols enabled on user device 100, version and usage information of various resources stored on user device 100, and/or any other attributes associated with the state of user device 100. The device profile 152 may further comprise data indicating a date of last virus scan of user device 100, a date of last access by an IT representative, a date of last service by an IT representative, and/or any other data indicating maintenance and usage of user device 100. Moreover, the device profile 152 may comprise indications of the past behavior of associated users, such as accesses to one or more resource 154, charges for such accesses, and the inventory accessed from such resources 154. Furthermore, device profile 152 may indicate a current location associated with user device 100 and/or a home location associated with user device 100. Similarly, device profile 152 may indicate a current time associated with user device 100 and/or a home time associated with user device 100, such as a time associated with a home location associated with user device 100. Device profile 152 may, for example, comprise data accessible to user device 100 via functions of user device 100, such as GPS location data, and/or via remote services communicatively coupled to user device 100, such as current time data provided by a remote time service.

User device 100 may be operable to perform at least one function. Functions of the user device 100 may include hardware functions, software functions, and applications executed by the user device 100. Hardware functions may include functions performed by hardware built-in to the user device 100, such as camera functions, microphone functions, video playback functions and/or the like. Hardware functions may further include functions performed by hardware communicatively coupled to the user device 100, such as Google Glass functions, printer functions, scanner functions, and/or other functions performed by peripheral devices. Software functions may include functions performed by software features of the user device 100, such as Siri and/or similar voice-activated functions that control the user device 100 without physical input to the user device 100. Furthermore, applications may include containerized applications configured for secure resource 154 distribution and access, secure browser applications, enterprise-developed applications, applications wrapped with application wrappers, and/or other applications executable by the user device 100.

Functions of user device 100 may have access to at least one resource 154. Resources 154 may be utilized by functions of the user device 100 when the user device 100 performs the functions. In certain embodiments, functions of user device 100 may access existing resources 154 required for execution of the functions. For instance, Google Glass functions may require access to GPS resources 154 provided by a GPS sensor of the user device 100, which may be paired with the Google Glass functions via a Bluetooth sensor, for the Google Glass functions to perform navigation functionality. In some embodiments, functions of user device 100 may create new resources 154 when executing the functions. For example, a camera function of the user device 100 may create photo and/or video resources 154 while executing the camera function.

User device 100 may store at least one resource 154 in the data store 150. Resources 154, for instance, may include any electronic data, such as databases, applications, text files, word processor files, spreadsheet files, presentation files, graphic files, audio files, photographic files, video files, applications and application files, and/or the like. More specifically, resources 154 may include at least one of the following file types: data files, audio files, video files, three-dimensional image files, raster image files, vector image files, page layout files, spreadsheet files, database files, executable files, CAD files, web files, plug-in files, font files, system files, settings files, encoded files, compressed files, disk image files, developer files, backup files, and/or any other files. User device 100 may also access at least one resource 154 stored in a resource server 210 and/or another server communicatively coupled to user device 100, as described herein.

In certain embodiments, functions of the user device 100 may be associated with an enterprise and/or may be personal to a user of the user device 100. Similarly, resources 154 accessible to functions of the user device 100 may be associated with an enterprise and/or may be personal to a user of the user device 100. In some embodiments, user devices 100 may be utilized to perform both enterprise and personal functions of the user device 100 and access both enterprise and personal resources 154. In particular, a user device 100 personal to a user of the user device 100 may be configured for additional enterprise use, for instance, via through an enterprise bring-your-own-device ("BYOD") deployment model. An enterprise may, for instance, employ a BYOD resource-access model to lower the cost of providing its employees with access to enterprise functions and/or resources 154. Additionally, an enterprise may, for example, employ a BYOD resource-access model to prevent the need for an employee to carry an additional enterprise-specific user device 100 to access enterprise functions and/or resources 154. Functionality Watermarking and Management may ensure, amongst other benefits, that enterprise functions and/or resources 154 are not compromised when accessed by a user device 100 with further access to personal functions and/or resources 154, and vice versa.

User device 100 may further store at least one watermark template 156 in the data store 150. Watermark templates 156 may include an arrangement of data and/or a file containing such arranged data. In certain embodiments, watermark templates 156 may include description data, such as data that describes the watermark templates 156 and/or other elements associated with the watermark templates 156, as described herein. In some embodiments, watermark templates 156 may include configuration data, such as data that configures the watermark templates 156 and/or other elements associated with the watermark templates 156, as described herein.

In certain embodiments, watermark templates 156 may be associated with at least one of at least one function of the user device 100, at least one resource 154 accessible to at least one function of at least one user device 100, at least one user device 100, at least one user of at least one user device 100, and at least one enterprise. In particular, watermark templates 156 may be associated such that there is a relationship between the watermark templates 156 and the certain functions, resources 154, user devices 100, users of user devices 100, and enterprises. In some embodiments, an administrator, such as an administrator of a watermark template server 220, may associate certain watermark templates 156 with certain functions, resources 154, user devices 100, users of user devices 100, and enterprises. As an example, an administrator of a watermark template server 220 may utilize a web-based console application to specify certain watermark templates 156 to associate with certain functions, resources 154, user devices 100, users of user devices 100, and enterprises.

Watermark templates 156 may include descriptive data that describes such functions of the user device 100, resources 154 accessible to the functions of the user device 100, the user device 100, users of the user device 100, and enterprises. In particular, watermark templates 156 may include one or more properties associated with such functions of the user device 100, such resources 154 accessible to such functions of the user device 100, such user devices 100, such users of such user devices 100, and such enterprises. Additionally, watermark templates 156 may include one or more source identifiers describing a creator and/or distributor of the watermark templates 156, timestamps associated with various actions performed with respect to the watermark templates 156, and locations associated with various actions performed with respect to the watermark templates 156.

Properties associated with functions of user devices 100 may include, for instance, at least one of prior functions performed on such user devices 100, sensitivity levels of such functions of such user devices 100, and/or security requirements associated with such functions of such user devices 100. In particular, properties associated with prior function performances may include a timestamp and location describing when and where a user device 100 last performed a camera function, properties associated with function sensitivity levels may identify the camera function as "FOR CLASSIFIED USE ONLY," and properties associated with function security requirements may include a requirement that a source identifier identifying a user device 100 and/or a user of a user device 100 that performs the camera function be captured upon the user device 100 performing the camera function.

Properties associated with resources 154 accessible to functions of user devices 100 may include, for instance, at least one of prior functions accessing such resources 154, sensitivity levels of such resources 154, and/or security requirements associated with such resources 154, as described herein. In particular, properties associated with prior functions accessing such resources 154 may identify an application on a user device 100 that last edited a resource 154, properties associated with resource 154 sensitivity levels may identify a resource 154 as "PRIVILEGED AND CONFIDENTIAL," and properties associated with resource 154 security requirements may include a requirement that a resource 154 can only be accessed by a user device 100 while the user device 100 is located at an enterprise facility associated with the resource 154.

Properties associated with user devices 100 may specify and/or describe, for example, at least one user device 100 identifier, user device 100 hardware feature, user device 100 software feature, user device 100 application, current time associated with such user devices 100, current location associated with such user devices 100, and home location associated with such user devices 100. As an example, properties associated with user devices 100 may include a listing of hardware features active on a user device 100 and/or accessible to a user device 100 at a current time associated with the user device 100 and a current location associated with a user device 100 at a current time associated with the user device 100. In particular, a current time associated with a user device 100 may be identified via the system clock of the user device 100, and a current location associated with a user device 100 may be identified via a GPS sensor of the user device 100. Properties associated with user device 100 may further include a determination of whether the user device 100 complies with at least one compliance rule 158 based at least in part on a device profile 152 describing the state of the user device 100, as described herein.

Properties associated with users of user devices 100 may include, for example, at least one user identifier, user credential, user role identifier, enterprise identifier, current time associated with the user, current location associated with the user, and home location associated with the user. User role identifiers may, for instance, specify a job title, job function, and/or the like describing the role of the user with respect to an enterprise. Enterprise identifiers may, for example, specify an enterprise affiliated with a user, such as an enterprise that employs the user and/or provides resource 154 access to the user. Current times associated with a user and current locations associated with a user may, for instance, specify a current time and/or current location associated with the user device 100 associated with the user. Home locations associated with a user may, for instance, specify a primarily location of a user, such as a location where the user resides and/or a location where the user is employed.

Properties associated with an enterprise may include, for instance, at least one facility location of the enterprise, phone number of the enterprise, employee of the enterprise, executive of the enterprise, business type of the enterprise, industry of the enterprise, and/or other data describing the enterprise. Furthermore, descriptive data of a watermark template 156 may include at least one of a source identifier, a timestamp, and a location. A source identifier may specify, for instance, a user device 100, an administrator, and/or an enterprise associated with the creation of and/or modification of a watermark template 156. A timestamp may identify, for example, a time and date when a watermark template 156 was created, modified and/or associated. Similarly, a location may identify a geographic location where a watermark template 156 was created, modified and/or associated.

Watermark templates 156 may include such descriptive data by virtue of the association between the watermark templates 156 and such functions of the user device 100, resources 154 accessible to the functions of the user device 100, the user device 100, users of the user device 100, or enterprises. In certain embodiments, watermark templates 156 may include descriptive data that is populated based at least in part on such functions of the user device 100, resources 154 accessible to the functions of the user device 100, the user device 100, users of the user device 100, or enterprises. For example, watermark templates 156 may be populated by querying and/or analyzing the characteristics and/or state of such functions of the user device 100, resources 154 accessible to the functions of the user device 100, the user device 100, users of the user device 100, or enterprises, as described herein.

In certain embodiments, a watermark template 156 may include descriptive data that is determined and/or identified at the time the watermark template 156 is to be utilized and/or associated. In particular, a watermark template 156 may be dynamically composed such that the watermark template 156 includes dynamic descriptive data that is accurate at the time the watermark template 156 is viewed, applied, and/or otherwise used by a user device 100. In some embodiments, a watermark template 156 may acquire dynamic descriptive data with the assistance of a user device 100 communicatively coupled to the watermark template 156, such as via an agent application 250 and/or via an application programming interface communicatively coupled to an operating system 115 of a user device 100.

Dynamic descriptive data may include and/or describe, for example, a prior function performed on a user device 100 and/or prior action taken on a resource 154, such as a prior creation, prior access, prior modification, prior storage, and prior transmission of a resource 154 by a user device 100 and/or user of a user device 100. A transmission of a resource 154 may, for instance, include transmitting the resource 154 via a sharing feature, an email, an instant message, a text and/or multimedia message, a social media application, a FTP server, and/or other means of transmitting resources 154 between user devices 100. In some embodiments, a watermark template 156 may describe such prior functions and/or actions by including descriptive data detailing at least one user identifier, source identifier, timestamp, location, prior function and/or action type, contextual detail describing such prior action, property associated with a user device 100 associated with such prior action. Timestamps may, for instance, specify a date and/or time associated with the timestamp, such as a date and time when a resource 154 was shared by a certain user device 100, a date and time when the resource 154 was received from the sharing user device 100 by a recipient user device 100, a date and time when a resource 154 was annotated and/or otherwise modified by a certain user device 100, a date and time when a recipient user device 100 will cease to be authorized to perform actions on the resource 154, and/or a date and time when the resource 154 will expire and/or become inaccessible by user devices 100. A timestamp may further, for example, specify the context of the timestamp so as to describe the context of such dates and/or times. Contextual details describing such prior actions may include, for example, whether the associated user device 100 complied with at least one compliance rule 158 associated with such prior functions and/or actions on a resource 154, as described herein.

Watermark templates 156 may further include descriptive data that is static and/or does not change with respect to a resource 154, user device 100, user of a user device 100, and/or function of a user device 100. In some embodiments, static descriptive data may be pre-configured by an administrator of a watermark template server 220, as described herein. Static descriptive data may, for instance, specify a sensitivity level associated with a certain function of a user device 100 and/or resource 154 associated with the respective watermark template 156. Sensitivity levels associated with a function and/or resource 154 may specify that the function and/or resource 154 is at least one of the following: confidential, proprietary, privileged, and managed. For example, a function of a user device 100 that captures forensic evidence, such as a camera function and a microphone function, may be associated with a confidential sensitivity level and a privileged sensitivity level. As another example, a resource 154 that contains financial data may be associated with both a confidential sensitivity level and a proprietary sensitivity level.

A confidential sensitivity level may, for example, indicate that the respective function and/or resource 154 is the confidential property of an enterprise associated with the function and/or resource 154. A proprietary sensitivity level may, for instance, indicate that the function and/or resource 154 constitutes the intellectual property of an enterprise associated with the function and/or resource 154. A privileged sensitivity level may, for instance, indicate that the respective function and/or resource 154 is subject to and/or protected by an attorney-client relationship and/or the work product doctrine. A managed sensitivity level may, for example, indicate that the respective function and/or resource 154 is managed and/or controlled by a resource server 210, as described herein. More particularly, a managed sensitivity level may describe an enterprise and/or business that owns and/or controls the respective function and/or resource 154, which may also own and/or control a resource server 210 associated with and/or communicatively coupled to the respective resource 154.

Static descriptive data may also, for instance, specify a security requirement associated with a certain function and/or resource 154 associated with the respective watermark template 156. Security requirements may specify, for instance, certain authorized and/or unauthorized user identities, device identities, device hardware features, device software features, device applications, function performance times and/or durations, and function performance locations. In other words, security requirements may specify positive and negative criteria required for a certain user device 100 to perform a certain action on a resource 154 associated with such security requirements. For instance, a function of a user device 100, such as a camera function, may only be authorized during workday hours according to an enterprise security policy, which may be reflected by static descriptive data indicating that the camera function is prohibited outside workday hours. In some embodiments, user identities and device identities may include user identifiers and device identifiers, respectively. In certain embodiments, security requirements are expressed and/or enforced via compliance rules 158 associated with one or more user devices 100 subject to the security requirements, as described herein.

In certain embodiments, watermark templates 156 may be configured such that, when applied to a function of a user device 100, the watermark templates 156 are overlaid onto a graphical interface associated with the function of the user device 100. Additionally, watermark templates 156 may be configured such that, when applied to a function of a user device 100, the watermark templates 156 are added to at least one position within a graphical interface associated with the function of the user device 100. In some embodiments, watermark templates 156 may be configured such that, when applied to a resource 154 accessible to a function of a user device 100, the watermark templates 156 are overlaid onto the resource 154. Moreover, watermark templates 156 may be configured such that, when applied to a resource 154 accessible to a function of a user device 100, the watermark templates 156 are added to at least one position within the resource 154.

In particular, watermark templates 156, and/or data contained therein, may be added to at least one of a header of the resource 154, a body of the resource 154, a footer of the resource 154, a structural metadata element of the resource 154, a descriptive metadata element of the resource 154, and a wrapper encapsulating the resource 154. Structural metadata elements, which may not be visible to a viewer of a resource 154, may define the manner in which an applicable resource 154 must be named according to a naming convention and must be stored according to a storage structure convention. Descriptive metadata elements, which also may not be visible to a viewer of a resource 154, may describe the resource 154 according to the traits discussed herein. Wrappers encapsulating a resource 154 may include a security layer surrounding the resource 154, which may protect the underlying resource 154 from certain actions being taken on the resource 154, such as forwarding the resource 154 to an unauthorized recipient.

As an example, a watermark template 156 may include a collection of descriptive data and may be configured to add each of the collection of descriptive data to specific positions within a function of the user device 100 and/or a resource 154 accessible to a function of the user device 100 when the watermark template 156 is applied to the function and/or resource 154. More specifically, the watermark template 156 may include a name of an enterprise associated with the function and/or resource 154 and may be configured to add the enterprise name to the upper left corner of the function and/or resource 154 when the watermark template 156 is applied to the function and/or resource 154. The watermark template 156 may further include a current timestamp associated with a user device 100 requesting to perform the function and/or access the resource 154 and may be configured to add the current timestamp to the lower left hand corner of the watermark template 156 when the watermark template 156 is applied to the function and/or resource 154. The watermark template 156 may yet further include a statement of confidentiality and may be configured to add the confidentiality statement to a certain function and/or resource 154 in translucent font diagonally across the length of the function and/or resource 154 when the watermark template 156 is applied to the function and/or resource 154.

Furthermore, watermark templates 156 may further include configuration data. In certain embodiments, configuration data may configure watermark templates 156 and/or other elements associated with watermark templates 156, such as functions of user devices 100 and/or resources 154 accessible to functions of user devices 100.

In some embodiments, configuration data may configure descriptive data included in watermark templates 156, which may be associated with functions of user devices 100 and/or resources 154 accessible to functions of user devices 100. Configuration data may, for instance, specify where to position descriptive data within the watermark templates 156. Configuration data may further specify a textual formatting schema to apply to descriptive data included in watermark templates 156. As an example, configuration data of a watermark template 156 may specify that the name of an enterprise included in the watermark template 156 should be placed in the upper left hand corner and should be formatted in red colored, bold style, size 18 Times New Roman font. Consequently, upon associating such a watermark template 156 with a camera function of a user device 100, resources 154 created by such camera function may thereafter have the name of the enterprise overlaid onto such resources 154 in the upper left hand corner of the resources 154 in red colored, bold style, size 18 Times New Roman font.

In some embodiments, configuration data may also configure functions of user devices 100 and/or resources 154 accessible to functions of user devices 100. Configuration data may, for example, specify a naming convention to apply to functions and/or resources 154. In particular, configuration data of a watermark template 156 may specify that a camera function of a user device 100 that is associated with the watermark template 156 must name any resources 154 created by the camera function, such as photograph resources 154 and/or video resources 154, according to a naming convention that includes the name of an enterprise, a timestamp, and a location where the resources 154 where created. As an example, a timestamp and location may be determined at the time the camera function is performed by the user device 100 by querying the device profile 152 of the user device 100 to determine the current data and time associated with the user device 100 and the current location associated with the user device 100.

Configuration data of watermark templates 156 may also, for instance, specify a storage structure convention to apply to functions of user devices 100 and/or resources 154 accessible to user devices 100 that are associated with the watermark templates 156. In certain embodiments, a storage structure convention may specify at least one storage location where a user device 100 should store certain functions of the user device 100 and/or certain resources 154 accessible to certain functions of the user device 100. In particular, storage locations of storage structure conventions of watermark templates 156 may include at least one of certain memories of a user device 100 and/or a remote server, certain drives within certain memories, and certain folders within certain memories where a user device 100 should store elements associated with the watermark templates 156, such as functions and/or resources 154. In some embodiments, a storage structure convention may specify at least one file type in which a user device 100 should store certain functions of the user device 100 and/or certain resources 154 accessible to certain functions of the user device 100. As an example, file types of storage structure conventions of watermark templates 156 may specify that resources 154 captured by a microphone function of a user device that is associated with the watermark templates 156, such as voice recordings, must be stored in a digital rights management file format, must be encrypted using AES-256 encryption, and must be limited to a file size of under 1 MB to avoid excessive data network-related charges.

In certain embodiments, configuration data of watermark templates 156 may add functionality to and/or remove functionality from functions of the user device 100 and/or resources 154 accessible to the functions of the user device 100. Configuration data of watermark templates 156 may, for instance, add functionality buttons to a graphical interface of a function of the user device 100, which may add additional functionality to the functions provided by the function of the user device 100. As an example, a "camera controls" set of buttons may be added to a camera function of the user device 100 by applying a watermark template 156 to the camera function that includes configuration data for the "camera controls" set of buttons. As another example, a "media bar" may be added to a resource 154 created by a camera function of the user device 100 that allows a user of the user device 100 to quickly navigate to other resources 154 created by the camera function of the user device 100. Configuration data may also, for example, remove functionality from a function of the user device 100 by removing functionality buttons from a graphical interface of the function of the user device 100, which may prevent performance of certain functions of the function of the user device 100. Configuration data of watermark templates 156 may further, for instance, be applied to functions and/or resources 154 which include effective date-constrained certificates and/or cryptographic keys to prevent user devices 100 from accessing the functions and/or resources 154 beyond the effective date.

While watermark templates 156 may comprise visible indicators such as descriptive data, watermark templates 156 need not comprise visible indicators. In certain embodiments, a watermark template 156 may be configured to match the formatting of the function of the user device 100 and/or resource 154 to which the watermark template 156 is applied, where such formatting is non-visible in nature. For example, an audio watermark template 156 may be applied to a microphone function of a user device 100, where the audio watermark template 156 comprises a configurable message concatenated onto the audio resource 154 at the beginning of the existing audio, within the existing audio, and/or at the end of the existing audio of the audio resource 154. Additionally, an audio watermark template 156 may be applied to an audio resource 154, where the audio watermark template 156 comprises an audio marker that may be heard concurrently with the existing audio of the audio resource 154. Such an audio watermark template 156 may comprise a spoken audio and/or a non-spoken audio, such as a public domain, trademarked and/or copyrighted musical selection associated with an enterprise associated with the watermark template 156.

In some embodiments, a watermark template 156 may include symbols, letters, and/or numbers that may be visible to an individual but may not represent any recognizable message in combination with one another. For instance, a watermark template 156 may be configured to translate certain descriptive data from a format that may be recognizable to an individual into a format that may not be recognizable to the individual, such as translating a user identifier from "John Doe" to "62s3 89f." As another example, a watermark template 156 may be configured to systematically place certain symbols, letters, and/or numbers amongst a function of a user device 100 and/or resource 154 accessible to a function of a user device 100 when applied to the function and/or resource 154 such that the symbols, letters and/or numbers may only be deciphered with the assistance of a key specific to the systematic placement.

Furthermore, in certain embodiments, a watermark template 156 may be visible in nature but may not be recognizable to an individual due to the scale of the watermark template 156 in comparison to a function of the user device 100 and/or a resource 154 accessible to a function of the user device 100 to which the watermark template 156 is applied. A watermark template 156 and/or data included therein may be, for example, either extremely small or extremely large in comparison to a function and/or resource 154, such that watermark template 156 cannot be recognized when applied to the function and/or resource 154. In particular, descriptive data of a watermark template 156 may be applied to a function and/or resource 154 in a very small font such that the font cannot be seen amongst the pixels of the function and/or resource 154 without magnifying the function and/or resource 154.

In some embodiments, a watermark template 156 may be and/or include a tangential addition to a function of a user device 100 and/or a resource 154 such that the function and/or resource 154 remains visually identical to before the watermark template 156 was applied to the function and/or resource 154. For instance, the watermark template 156 may be and/or include metadata, an xml description, a file header, a file property, a function performance summary, a resource 154 change summary and/or the like that may be tangentially added to a function of a user device 100 and/or a resource 154 without altering the visible aspects of the function and/or resource 154. As an example, an annotation watermark template 156454 may be added to an annotation function of a user device 100, which may include a non-visible change history that specifies describes all annotations made with respect to resources 154 annotated by the annotation function of the user device 100 over the lifespan of the resources 154. For instance, a resource 154 annotated by an annotation feature of a user device 100 may be modified to include an image-based change summary that captures at least one of an initial state, a previous state, and/or a current state of the resource 154, which may be added to the resource 154 as soon as the annotation of the resource 154 is completed by the user device 100 and/or as a part of the annotation of the resource 154 by the user device 100. An image-based change history may be embodied, for instance, in a QR code and/or MD5 hash to condense the change summary into a small image, which might be even further reduced in size depending on a pixel resolution of the particular resource 154 and a configurable required rendering quality for the change summary and/or particular resource 154.

In certain embodiments, user devices 100 may apply watermark templates 156 to certain functions of the user device 100 and/or certain resources 154 accessible to certain functions of the user device 100. As a high level example and described herein, an administrator may specify a watermark template 156 to apply to a function of a user device 100, such as a camera function. The watermark template 156 may be applied to the camera function via a compliance rule 158, which may specify that a user device 100 may only be authorized to perform the camera function while the watermark template 156 is applied to the camera function. The compliance rule 158 may be triggered, for instance, when the user device 100 identifies a request to perform the camera function, such as when a user of the user device 100 launches a camera application on the user device 100. In order to maintain a state of compliance with the compliance rule 158, the user device 100 may apply the watermark template 156 to the camera function of the user device 100 in a manner specified by the compliance rule 158. For instance, the user device 100 may overlay the watermark template 156 onto a graphical interface associated with the camera function and add the watermark template 156 to any photograph resources 154 created by the camera function. In some embodiments, the watermark template 156 may identify the owner of the user device 100 such that the photograph resources 154 created by the camera function may be visually identified as owned by the owner of the user device 100 via the watermark template 156.

As described herein, a watermark template 156 may be overlaid onto and/or added to a function of the user device 100 and/or a resource 154 accessible to a function of the user device 100, such that the watermark template 156 and the function and/or resource 154 are united when viewed by an individual. For example, a resource 154 may be modified such that a plurality of descriptive text of a watermark template 156 may be visible on the resource 154. Furthermore, the function and/or resource 154 may appear largely the same as before the watermark template 156 is overlaid onto and/or added to the function and/or resource 154, as the watermark template 156 may include a translucent body and/or background that may allow the underlying function and/or resource 154 to remain visible amongst the data included within the watermark template 156.

In certain embodiments, a function and/or resource 154 may be marked and/or badged with "Watermarked" and/or the like to indicate that a watermark template 156 is applied to the function and/or resource 154. Similarly, a function and/or resource 154 may be marked and/or badged with indicia of an action that triggered a watermark template 156 to be applied to such function and/or resource 154 via a compliance rule 158, such as by placing a diagonal badge across the upper left corner of an icon of the function and/or resource 154 stating "Shared" to indicate that the function and/or resource 154 was watermarked in response the resource 154 being shared with another user device 100. For instance, an icon representing the function and/or resource 154 may be marked and/or badged to indicate that the function and/or resource 154 was watermarked upon being shared.

In some embodiments, the manner of which a user device 100 associates a watermark template 156 with a resource 154 may be based at least in part on the type of resource 154 that will be associated with the watermark template 156. For example, an image resource 154 may have a watermark template 156 superimposed on the image resource 154 such that the watermark template 156 and the underlying image are concurrently visible, as described herein. As another example, an email resource 154 may have a watermark template 156 displayed as an overlay and/or underlay to the email resource 154 and/or the watermark template 156 may be included as a header and/or signature to the email resource 154. As a further example, a word processing, spreadsheet and/or presentation ("productivity") resource 154 may comprise a watermark template 156 in at least one of the following: displayer in a header and/or footer section of the productivity resource 154, incorporated as visible and/or non-visible metadata in the productivity resource 154, and/or displayed as an overlay, underlay, and/or adjacent image to at least a portion of the content of the productivity resource 154. In some embodiments, a watermark template 156 may be repeated so as to be visible and/or affixed in at least one of the above manners on each page, slide, worksheet, etc. of the productivity resource 154.

In certain embodiments, a watermark template 156 may be permanently applied to a function of the user device 100 and/or a resource 154 accessible to a function of the user device 100. For example, a function and/or resource 154 may be permanently modified such that descriptive text of a watermark template 156 cannot be removed from the function and/or resource 154. Furthermore, a series of watermark templates 156 may be applied to a function and/or resource 154 over the lifespan of the function and/or resource 154, such that a watermark template 156 is applied to a function and/or resource 154 with one or more previously applied watermark templates 156. For instance, watermark templates 156 may be applied to functions and/or resources 154 according to a plurality of compliance rules 158, as described herein, such that a watermark template 156 is applied to the functions and/or resources 154 upon certain actions being taken with respect to the functions and/or resources 154. More specifically, a watermark template 156 may be applied to a resource 154 each time a user device 100 seeks to share the resource 154, where the applied watermark template 156 may be dynamically populated based on a current context, including a current location, a current timestamp and a device identifier associated with the request to share the resource 154.

Some descriptive data included in a watermark template 156 may be static, such as the title of a resource 154 and a current timestamp associated with an initial creation of the resource 154, and may, therefore, remain the same each time the watermark template 156 is applied to a function of the user device 100 and/or a resource 154 accessible to a function of the user device 100. However, some descriptive data included in a watermark template 156 may be dynamic, such as a property associated with a user device 100, and may therefore be updated each time the watermark template 156 is applied to a function and/or a resource 154. For instance, the watermark template 156 may be updated upon each application with a function and/or resource 154 based at least in part on a device profile 152 of the user device 100.

In some embodiments, a function of the user device 100 and/or a resource 154 accessible to a function of the user device 100 may include many watermark templates 156 that were previously applied to the function and/or resource 154. The function and/or resource 154 may thereby include a comprehensive set of data that continues to increase over the lifespan of the function and/or resource 154, as each additional watermark template 156 applied to the function and/or resource 154 may increase the comprehensive set of data applied to the function and/or resource 154. In particular, a function and/or resource 154 may be layered with many watermark templates 156 and may thereby provide a history of the resource 154. For instance, a resource 154 may include descriptive data of a first watermark template 156 after the first watermark template 156 is applied to the resource 154, the resource 154 may include descriptive data of the first watermark template 156 and descriptive data of a second watermark template 154 after the second watermark template 156 is applied to the resource 154, and so on. Alternatively, in some embodiments, a function and/or resource 154 may only include a newly applied watermark template 156, as previously applied watermark templates 156 may be removed from the function and/or resource 154 upon applying a new watermark template 156.

Moreover, user device 100 may store one or more compliance rules 158. Compliance rules 158 may be associated with at least one of certain user devices 100, certain users of user devices 100, and certain resources 154. For instance, compliance rules 158 may be associated with certain resources 154 when certain users of certain user devices 100 request and/or initiate certain actions on such resources 154, such as when a certain employee using a certain tablet seeks to email certain documents to certain recipients that are not affiliated with the respective enterprise. Compliance rules 158 may be associated with such user devices 100, users of user devices 100, and/or resources 154 by an administrator of a compliance rule server 230, as described herein.

Compliance rules 158 may specify security requirements, conditions and/or events required for user device 100 to perform certain functions on user device 100. In some embodiments, compliance rules 158 may specify certain methods and/or steps of methods that must be performed before a user device 100 is authorized to perform certain functions of the user device 100 and/or access certain resources 154. In particular, compliance rules 158 may specify that certain watermark templates 156 must be applied to certain functions of a user device 100 for the user device 100 to gain authorization to perform the functions of the user device 100. Similarly, compliance rules 158 may specify that certain watermark templates 156 must be applied to certain resources 154 accessible to certain functions of a user device 100 for the user device 100 to gain authorization to access the resources 154 and/or perform the functions.

In some embodiments, compliance rules 158 may specify that user device 100 must satisfy and/or comply with a single condition for user device 100 to be authorized to perform certain functions of user device 100 and/or access certain resources 154 associated with the compliance rules 158. For instance, compliance rules 158 may require that user device 100 is associated with a current time that is within an authorized time period specified by such compliance rules 158 in order for user device 100 to be authorized to perform certain functions and/or access certain resources 154. More specifically, compliance rules 158 may specify that user device 100 is authorized to share a business email resource 154, such as by email, while the system clock of user device 100 is within a configured workday and user device 100 is not authorized to access the business email resource 154 while the system clock of user device 100 is outside of the configured workday. In some embodiments, compliance rules 158 may specify that user device 100 must satisfy and/or comply with more than one condition for user device 100 to be authorized to perform certain functions and/or access certain resources 154. For example, compliance rules 156 may specify that user device 100 must be associated with a "safe zone" location, such as an enterprise office location, to upload certain sensitive resources 154 accessible to user device 100, such as those affiliated with an enterprise, which may require that both a GPS sensor of user device 100 indicates that user device 100 is currently located within the geographic boundaries of the safe zone and that a Wi-Fi sensor of user device 100 indicates that user device 100 is communicatively coupled to a Wi-Fi network access point associated with the safe zone.

In some embodiments, compliance rules 158 may specify that user device 100 and another computing device, such as another user device 100, must both satisfy and/or comply with one or more conditions for user device 100 to be authorized to perform certain functions of user device 100 and/or access certain resources 154. Compliance rules 158 may require that user device 100 be located within proximity of and/or be communicatively coupled to a secondary user device 100 and that both user devices 100 be located within an authorized location in order to perform certain functions and/or or access certain resources 154. As an example, compliance rules 158 may specify that user devices 100 associated with nurses may only access resources 154 associated with their patients, such as a patient's medical records, while the user devices 100 associated with such nurses are located within ten feet of user devices 100 associated with such patients and while the user devices 100 associated with nurses and user devices 100 associated with patients are both located within examination rooms reserved for such patients' appointments.

In certain embodiments, compliance rules 158 may be granular such that the user device 100 may be authorized to perform certain functions and/or access certain resources 154 depending on how many of the conditions of the compliance rules 158 are satisfied by user device 100. For example, user device 100 may be authorized to access an enterprise contact resource 154 on user device 100 if a GPS sensor on user device 100 indicates that user device 100 is located within the enterprise's location, but user device 100 may be prohibited from sending an email with an enterprise resource 154 attached to the email until a certain watermark template 156 is applied to the enterprise resource 154 and until it is confirmed that the user device 100 is located within a "safe zone" by being communicatively coupled to a Wi-Fi network access point associated with the enterprise.

In some embodiments, an agent application 250 ("agent app") on the user device 100 may determine whether compliance rules 158 are satisfied by the user device 100, as described herein. For instance, an agent application 250 may determine whether user device 100 complies with certain compliance rules 158 by determining whether device profile 152 provides indications that user device 100 complies with such compliance rules 156. As an example, an agent application 250 may determine whether device profile 152 specifies that the current time associated with user device 100 is within a configured workday specified by compliance rules 158. Alternatively, the user device 100 may transmit all and/or a portion of device profile 152 to a compliance server 230, which may determine whether user device 100 satisfies the compliance rules 158.

In any case, the user device 100 may be authorized and/or instructed to perform functions of user device 100 and/or access certain resources 154 in response to a determination that the user device 100 complies with the compliance rules 158. In certain embodiments, an agent application 250 may authorize requests by the user device 100 to perform functions and/or access resources 154 by transmitting instructions to the operating system 115 of user device 100 and/or communicating with such operating system 115 via an API and/or SDK. In some embodiments, a compliance server 230 may authorize requests by the user device 100 to perform functions and/or access resources 154 by transmitting instructions to the operating system 115 of user device 100 and/or communicating with such operating system 115 via an API and/or SDK.

Furthermore, embodiments of this disclosure may be practiced in conjunction with a graphics library, other operating systems, or any other application program and is not limited to any particular application or system. The devices described with respect to the Figures may have additional features or functionality. For example, user device 100 may also include additional data storage devices (removable and/or non-removable) such as, for example, magnetic disks, optical disks, or tape (not shown).

Figure 2:
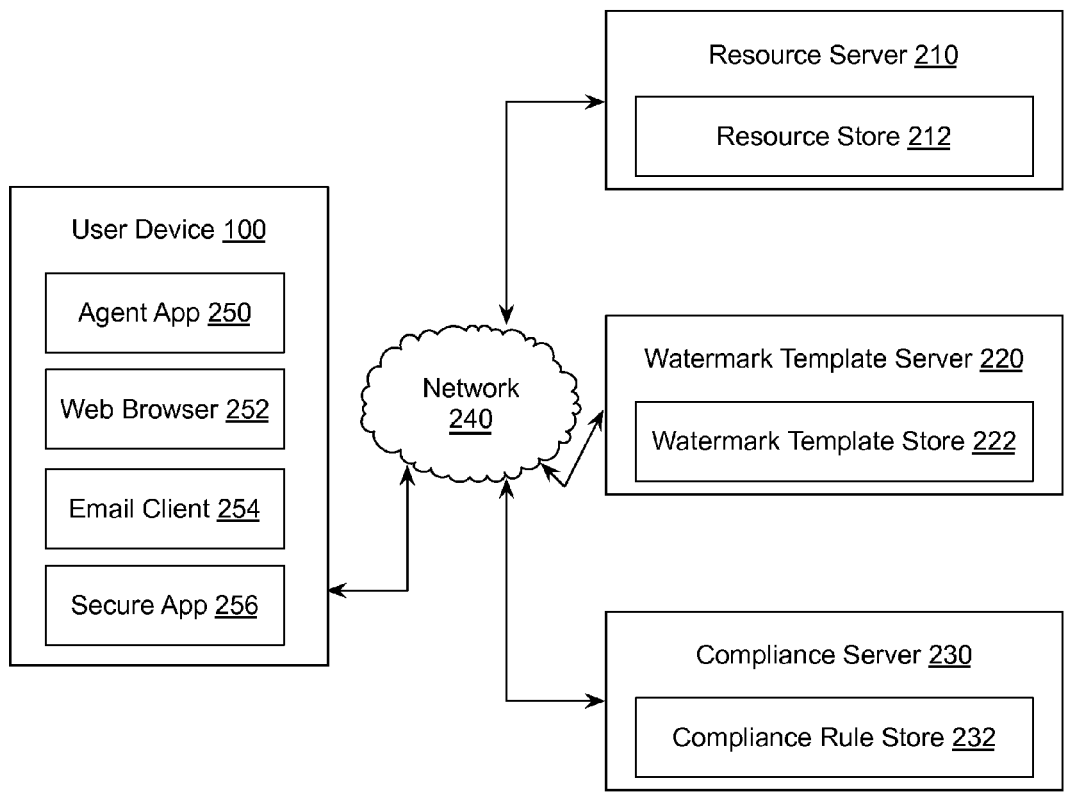
FIG. 2 is a block diagram of an operating environment; and,
FIG. 3 is a flow chart illustrating a method for providing functionality watermarking and management.

FIG. 2 is a block diagram view of an operating environment 200 showing other elements operating with the user device 100, such as a network 240, resource server 210, watermark template server 220, and compliance server 230. In some embodiments, the user device 100 may include and/or execute at least one of the following: an agent app 250, a web browser 252, an email client 254, and a secure application 256. The agent app 250 may comprise, for instance, an application communicatively coupled to at least one of the resource server 210, watermark template server 220, and compliance server 230 so as to enable such servers to instruct the user device 100 to perform certain actions on the user device 100, such as take certain actions on certain resources 254, associated certain watermark templates 156 with certain resources 254, and conform its operations to certain configuration profiles 158. The web browser 252 may comprise, for example, an application communicatively coupled to the network 240 that is capable of at least one of the following: viewing websites, downloading resources 154 from web servers, uploading resources 154 to web servers, executing web applications, and/or the like. The email client 254 may comprise, for instance, an application communicatively coupled to the network 240 that is capable of sending email resources 154, receiving email resources 154, scheduling calendar resources 154, storing contact resources 154 and/or other operations provided by personal information managers ("PIM's"). Furthermore, the secure app 256 may comprise, for instance, a containerized resource application that is capable of receiving resources 154, storing the resources 154 within the container to protect the resources 154 from access attempts by other applications on the user device 100, and provide access to the resources 154 in accordance with and/or in compliance with compliance rules 158 associated with the resources 154.

In certain embodiments, the agent app 250, web browser 252, email client 254, and secure app 256 may be configured to create event logs that detail operations carried out by the agent app 250, web browser 252, email client 254, and secure app 256. In particular, event logs may capture each application's operations with respect to performance of functions of the user device 100, access to resources 154, application of watermark templates 156 to functions and/or resources 154 over the lifespan of the functions and/or resources 154, and the user device's 100 compliance with applicable compliance rules 158. The agent app 250, web browser 252, email client 254, and secure app 256 may be further configured to transmit event logs to at least one of the resource server 210, watermark template server 220, and compliance server 230, which may be utilized by each server in its execution of management systems and/or applications associated with the user device 100. More specifically, the user device 100 may transmit event logs to servers executing at least one of an enterprise mobility management service, a mobile device management service, a mobile content management service, a mobile application management service, and a mobile email management service.

In some embodiments, the user device 100 may be communicatively coupled to the resource server 210, watermark template server 220, and compliance server 230 via the network 240. The network 240 may include, for instance, a cellular network, Wi-Fi network, Bluetooth network, and/or any other network capable of transmitting data between and/or or amongst user device 100, resource server 210, watermark template server 220, and compliance server 230. While the resource server 210, the watermark template server 220, and the compliance server 230 are represented as separate elements amongst operating environment 200, it is understood that such servers could be combined into a single server capable of performing the same and/or similar functionality that each of the resource server 210, the watermark template server 220, and the compliance server 230 may be capable of performing separately, such as executing a management system and/or application.

In some embodiments, the resource server 210 may comprise a server that manages a plurality of resources 154, such as resources 154 associated with an enterprise. The resource server 210 may include a resource store 212, which may store such resources 154. The resource server 210 may transmit resources 154 to the user device 100 and may receive transmissions of resources 154 from the user device 100 via the network 240. The resource server 210 may be associated with the user device 100, for instance, by enrolling the user device 100 into a management system and/or application executed by resource server 210. More specifically, resource server 210 may distribute certain settings and/or configuration profiles to the user device 100 that enables resource server 210 to instruct user device 100 to perform certain functions, such as instructing user device 100 to download certain resources 154 from resource store 212 of resource server 210. The resource server 210 may also track and/or manage access to resources 154 associated with the resource server 210, such as by receiving event logs transmitted by user device 100 and/or recording accesses to the resources 154. The event logs may include and/or describe usage of the resource 154 by detailing, for instance, a device identifier associated with a user device 100, a user identifier associated with a user of a user device 100, a resource 154, a watermark template 156 associated with a resource 154, an request to perform an action on a resource 154, an action performed on a resource 154, and/or the like.

In some embodiments, the watermark template server 220 may comprise a server that manages a plurality of watermark templates 156. The watermark template server 220 may include a watermark template store 222, which may store such watermark templates 156. The watermark template server 220 may transmit watermark templates 156 to the user device 100 via the network 240. The watermark template server 220 may also receive transmissions of resources 154 with watermark templates 156 applied to the resources 154 from the user device 100. The watermark template server 220 may be associated with the user device 100, for instance, by enrolling the user device 100 into a management system and/or application executed by watermark template server 220. More specifically, watermark template server 220 may distribute certain settings and/or configuration profiles to the user device 100 that enables watermark template server 220 to instruct user device 100 to perform certain functions, such as instructing user device 100 to download certain watermark templates 156 from watermark template store 222 of watermark template server 220 and/or to apply certain watermark templates 156 to certain functions of the user device 100 and/or resources 154 accessible to functions of the user device 100. The watermark template server 220 may also track and/or manage the usage of watermark templates 156 associated with the watermark template server 220, such as by receiving event logs transmitted by user device 100 and/or recording accesses to the watermark templates 156. The event logs may include and/or describe usage of the watermark templates 156 by detailing, for instance, a device identifier associated with a user device 100, a user identifier associated with a user of a user device 100, a request to perform a function on the user device 100 and/or access a resource 154, an function performed and/or a resource 154 accessed, a watermark template 156 applied to a function and/or resource 154, etc.

In some embodiments, the compliance server 230 may comprise a server that manages a plurality of compliance rules 158. The compliance server 230 may include a compliance rule store 232, which may store such compliance rules 158. The compliance server 230 may transmit compliance rules 158 to the user device 100 and may receive transmissions of compliance audits and/or device profiles 152 that may be used to determine whether the user device 100 complies with compliance rules 158 from the user device 100 via the network 240. The compliance server 230 may be associated with the user device 100, for instance, by enrolling the user device 100 into a management system and/or application executed by compliance server 230. More specifically, compliance server 230 may distribute certain settings and/or configuration profiles to the user device 100 that enable the compliance server 230 to instruct the user device 100 to perform certain functions of the user device 100 and/or access certain resources 154. As an example, compliance rules 158 may be transmitted from a compliance server 230 to a user device 100 to instruct an agent application 250 on the user device 100 to determine whether the user device 100 complies with certain compliance rules 158 based on the device profile 152 associated with the user device 100 before authorizing the user device 100 to perform certain functions of the user device 100 and/or access certain resources 154 accessible to certain functions of the user device 100. The compliance server 230 may also track and/or manage the usage of compliance rules 158 associated with the compliance server 320, such as by receiving event logs transmitted by user device 100 and/or recording compliance determinations with respect to the compliance rules 158.

Figure 3:
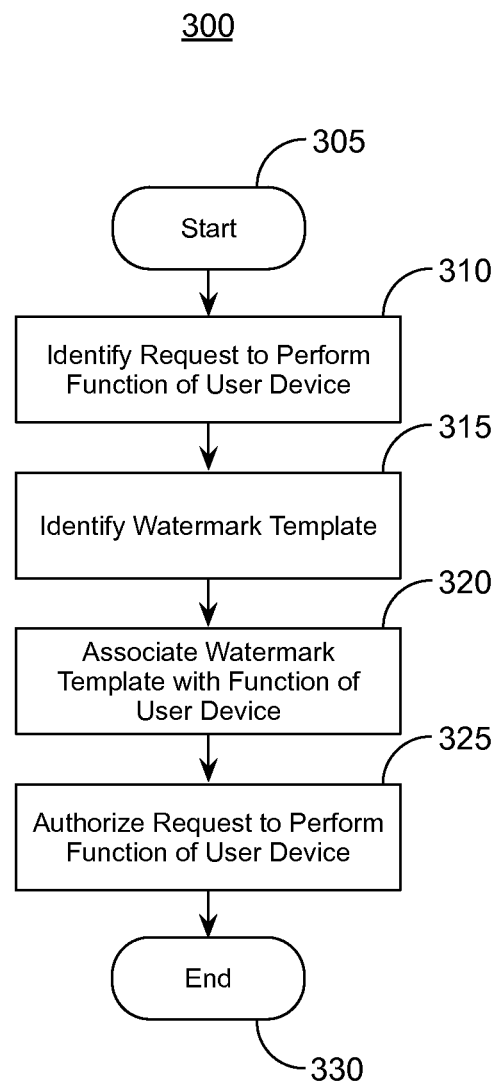

FIG. 3 is a flow chart setting forth the general stages involved in a method 300 consistent with embodiments of this disclosure for providing functionality watermarking and management. Method 300 may be implemented using element(s) of operating environment 200, such as user device 100, resource server 210, watermark template server 220, compliance server 230, and network 240, as described above. Ways to implement the stages of method 300 will be described in greater detail below.

Method 300 may begin at starting block 305 and proceed to stage 310 where a request to perform at least one function of a user device 100 is identified. Requests to perform functions of the user device 100 may include, for instance, requests to perform hardware functions, software functions, and/or applications executed by the user device 100. In certain embodiments, an agent application 250 on a user device 100 may monitor the operations of the user device 100 to identify requests to perform functions of the user device 100. For instance, an agent application 250 may identify requests transmitted by hardware functions, software functions and/or applications executed by the user device 100 to an operating system 115 of the user device 100, which may request the operating system 115 to perform certain functions of the user device 100 that are controlled by the operating system 115 of the user device 100. Additionally, an agent application 250 may identify requests transmitted by hardware functions, software functions and/or applications executed by the user device 100 to a service communicatively coupled to the user device 100, such as a resource server 210, a watermark template server 220, or a compliance server 230. In some embodiments, a service communicatively coupled to the user device 100 may identify requests transmitted by the user device 100 to such service to identify requests by the user device 100 to perform functions of the user device 100.

From stage 310, method 300 may advance to stage 315 where at least one watermark template 156 is identified. In certain embodiments, watermark templates 156 may be identified that are associated with at least one of the identified functions of the user device 100, resources 154 accessible to identified functions of the user device 100, the user device 100, a user of the user device 100, and an enterprise. In some embodiments, an administrator of a watermark template server 220 may associate a watermark template 156 with certain functions of the user device 100, resources 154 accessible to identified functions of the user device 100, user devices 100, users of user devices 100, and enterprises based on an affiliation between the watermark template 156 and the functions of the user device 100, resources 154 accessible to identified functions of the user device 100, user devices 100, users of user devices 100, and enterprises. As an example, the data store 150 of the user device 100 may be searched and/or queried to identify watermark templates 156. As another example, a watermark template store 222 within a resource server 220 communicatively coupled with the user device 100 may be searched and/or queried to identify watermark templates 156.

From stage 315, method 300 may advance to stage 320 where the identified watermark templates 156 are applied to the identified functions of the user device 100. In certain embodiments, watermark templates 156 may be applied to the functions of the user device 100 by overlaying the watermark templates 156 onto at least one graphical interface associated with the functions of the user device 100. Also, watermark templates 156 may be applied to resources 154 accessible to functions of the user device 100 by overlaying the watermark templates 156 onto the resources 154. In particular, watermark templates 156 may be applied to resources 154 created by the identified functions of the user device 100, modified by the identified functions of the user device 100, stored by the identified functions of the user device 100, and/or transmitted by the identified functions of the user device 100. More particularly, resources 154 transmitted by the user device 100 may include resources 154 emailed, instant messaged, text messaged, uploaded or transmitted via a file transfer within the user device 100, to another user device 100, and/or to a service communicatively coupled to the user device 100.

In some embodiments, watermark templates 156 may be applied to the functions of the user device 100 by adding the watermark templates 156 to at least one graphical interface associated with the functions of the user device 100 in at least one position within the graphical interface. Additionally, watermark templates 156 may be applied to resources 154 accessible to functions of the user device 100 by adding the watermark templates 156 to the resources 154 in at least one position within the resources 154. In certain embodiments, watermark templates 156 may be added resources 154 accessible to functions of the user device 100 in at least one of the a header of the resource 154, a footer of the resource 154, a structural metadata element of the resource 154, a descriptive metadata element of the resource 154, and a wrapper encapsulating the resource 154. In any case, watermark templates 156 may be positioned within the functions of the user device 100 and/or resources 154 accessible to functions of the user device 100 over the lifespan of the functions and/or resources 154 according to a pre-defined placement algorithm and/or sequence, such that multiple watermark templates 156 may be applied to a single function and/or resource 154 without overwriting previously applied watermark templates 156.

From stage 320, method 300 may advance to stage 325 where the identified requests to perform functions of the user device 100 are authorized. In certain embodiments, the identified requests to perform the functions of the user device 100 may only be authorized while the identified watermark templates 156 are applied to the respective functions of the user device 100. In some embodiments, the authorization of the identified requests to perform the functions of the user device 100 may occur concurrently with the application of the identified watermark templates 156 to the respective functions of the user device 100. Upon completing the authorization step of stage 325, the method 300 may end at stage 330.

In certain embodiments, requests to perform functions of the user device 100 may be authorized by instructing the user device 100 that the request is authorized and/or by instructing the user device 100 to perform the requested at least one function. In some embodiments, requests to perform functions of the user device 100 may be authorized by permitting the user device 100 to perform the at least one function without interference, such as by taking no action. As an example, an agent application 250 may transmit commands to the operating system 115 of the user device 100 via an API that specify that the user device 100 should authorize the request to perform the functions of the user device 100. Additionally, a compliance server 230 may transmit commands to the user device 100, and/or functions of the user device 100, that specify that the user device 100 should authorize the request to perform the functions of the user device 100.

In some embodiments, requests to perform the functions of the user device 100 may only be authorized while the user device 100 complies with at least one compliance rule 158. As an example, an agent application 250 may determine whether the user device 100 complies with the compliance rules 158, which may be determined based on a device profile 152 of the user device 100 describing the state of the user device 100. Additionally, a compliance server 230 may receive a device profile 152, or data contained therein, and determine whether the user device 100 complies with the compliance rules 158, which may be stored within the compliance rule store 232. In any case, requests to perform functions of the user device 100 may be denied if it is determined that the user device 100 does not comply with the compliance rules 158.

In certain embodiments, requests to perform functions of the user device 100 may be denied by instructing the user device 100 that the request is not authorized and/or by instructing the user device 100 not to perform the requested function. In some embodiments, requests to perform functions of the user device 100 may be denied by preventing the user device 100 from performing the requested function, such as by transmitting commands to the user device 100 that specify that the user device 100 should delete data from storage locations associated with the function of the user device 100. As an example, an agent application 250 may transmit commands to the operating system 115 of the user device 100 via an API that specify that the user device 100 should deny the request to perform the identified functions of the user device 100. Additionally, a compliance server 230 may transmit commands to the user device 100, and/or functions of the user device 100, that specify that the user device 100 should deny the request to perform the identified functions of the user device 100.

In some embodiments, event logs may be created that specify at least one property describing the application of the identified watermark template 156 to the function of the user device 100 and/or the authorization of the request to perform the function of the user device 100. Event logs may, for example, specify at least one of a user identifier, a device identifier, a determination of whether the user device 100 complies with at least one compliance rule 158, a source identifier, a timestamp, and a location describing the context of the watermark template 156 application step and/or the identified request authorization step. Event logs may, for instance, facilitate the management of the respective user device 100 by providing data necessary for the operations of enterprise mobility management services and/or the like. Accordingly, in certain embodiments, event logs may be transmitted to a service communicatively coupled to the user device 100, such as a resource server 210, watermark template server 220, and/or compliance server 230.

An embodiment consistent with the disclosure may comprise a method for providing functionality watermarking and management. The method may comprise identifying a request to perform at least one function of a user device, identifying at least one watermark template, applying the at least one watermark template to the at least one function of the user device, and authorizing the request to perform the at least one function of the user device.

Another embodiment consistent with the disclosure may comprise an apparatus for providing functionality watermarking and management. The apparatus may comprise at least one processor and at least one memory having program code instructions embodied therein, the at least one memory and program code instructions being configured to, with the at least one processor, direct the apparatus to at least identify a request to perform at least one function of a user device, identify at least one watermark template, apply the at least one watermark template to the at least one function of the user device, and authorize the request to perform the at least one function of the user device.

Yet another embodiment consistent with the disclosure may comprise a computer program product for providing functionality watermarking and management. The computer program product comprising a non-transitory computer-readable storage medium having program code portions embodied therein, the program code portions being configured to, upon execution, direct an apparatus to at least identify a request to perform at least one function of a user device, identify at least one watermark template, apply the at least one watermark template to the at least one function of the user device, and authorize the request to perform the at least one function of the user device.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, non-transitory media, and/or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A non-transitory computer-readable medium embodying a program executable in a client device, comprising code that:
    identifies a request to perform a function of the client device, the function being associated with a compliance rule;
    queries a data store to identify at least one watermark template from a plurality of available watermark templates, the at least one watermark template being identified based at least in part on the function of the client device requested to be performed;
    applies the at least one watermark template to the function of the client device such that a performance of the function complies with the compliance rule by:
        causing descriptive data to be added to the at least one particular watermark template, the descriptive data being descriptive of the function of the client device; and
        causing at least a portion of the at least one watermark template to be added to at least one resource generated during performance of the function;
        causing the at least one resource generated by the function of the client device to be named in accordance with a naming convention specified in configuration data of the at least one watermark template; and
    receives an authorization from a compliance server that causes the client device to perform the function identified in the request, the authorization being determined by the compliance server using at least a device profile describing a state of the client device indicating whether the at least one computing device complies with the compliance rule.

2. The non-transitory computer-readable medium of claim 1, wherein the request to perform the function is transmitted by a hardware function or a software function as an operating system of the client device.

3. The non-transitory computer-readable medium of claim 1, wherein the code that applies the at least one watermark template to the function further comprises code that adds the at least one watermark template to a graphical interface in association with the function requested to be performed.

4. The non-transitory computer-readable medium of claim 1, wherein the code that applies the at least one watermark template to the function further comprises code that adds metadata to a resource associated with the function of the client device.

5. The non-transitory computer-readable medium of claim 1, wherein the code that applies the at least one watermark template to the function further comprises code that adds a visual watermark to a header, a footer, or a body of a resource associated with the function.

6. The non-transitory computer-readable medium of claim 1, wherein:
the function further comprises a microphone function; and
the code that applies the at least one watermark template to the function further comprises code that applies an audio watermark to the microphone function by concatenating an audio resource with a configurable message.

7. A system, comprising:
a user device comprising a local data store; and
program code executed in the user device that causes the user device to at least:
identify a request to perform a function of the user device, the function being associated with a compliance rule;
query the local data store to identify at least one watermark template from a plurality of available watermark templates, the at least one watermark template being identified based at least in part on the function of the user device requested to be performed;
apply the at least one watermark template to the function of the user device such that a performance of the function complies with the compliance rule by:
causing descriptive data to be added to the at least one particular watermark template, the descriptive data being descriptive of the function of the user device; and
causing at least a portion of the at least one watermark template to be added to at least one resource generated during performance of the function;
causing the at least one resource generated by the function of the user device to be named in accordance with a naming convention specified in configuration data of the at leas one watermark template; and
receive an authorization from a compliance server that causes the user device to perform the function identified in the request, the authorization being determined by the compliance server using at least a device profile describing a state of the user device indicating whether the at least one computing device complies with the compliance rule.

8. The system of claim 7, wherein the request to perform the function is transmitted by a hardware function or a software function of an operating system of the user device.

9. The system of claim 7, wherein the program code that causes the user device to apply the at least one watermark template to the function further comprises program code that causes the user device to add the at least one watermark template to a graphical interface in association with the function requested to be performed.

10. The system of claim 7, wherein the program code that causes the user device to apply the at least one watermark template to the function further comprises program code that causes the user device to add metadata to a resource associated with the function of the user device.

11. The system of claim 7, wherein the program code that causes the user device to apply the at least one watermark template to the function further comprises program code that causes the user device to add a visual watermark to a header, a footer, or a body of a resource associated with the function.

12. The system of claim 7, wherein:
the function further comprises a microphone function; and
the program code that causes the user device to apply the at least one watermark template to the function further comprises program code that applies an audio watermark to the microphone function by concatenating an audio resource with a configurable message.

13. The system of claim 7, further comprising program code that causes the user device to create at least one event log specifying a user identifier, a device identifier, a source identifier, a timestamp, a location, a determination of whether the user device complies with the compliance rule, or a combination thereof, associated with an application of the at least one watermark template to the function.

14. A method, comprising:
identifying, by at least one computing device, a request to perform a function on the at least one computing device, the function being associated with a compliance rule;
querying, by the at least one computing device, a data store to identify at least one watermark template from a plurality of available watermark templates, the at least one watermark template being identified based at least in part on the function requested to be performed;
applying, by the at least one computing device, the at least one watermark template to the function such that a performance of the function complies with the compliance rule by:
causing descriptive data to be added to the at least one particular watermark template, the descriptive data being descriptive of the function; and
causing at least a portion of the at least one watermark template to be added to at least one resource generated during performance of the function;
causing the at least one resource generated by the function to be named in accordance with a naming convention specified in configuration data of the at least one watermark template; and
receiving, by the at least one computing device, an authorization from a compliance server that causes the at least one computing device to perform the function identified in the request, the authorization being determined by the compliance server using at least a device profile describing a state of the at least one computing device indicating whether the at least one computing device complies with the compliance rule.

15. The method of claim 14, wherein the request to perform the function is transmitted by a hardware function or a software function of an operating system of the at least one computing device.

16. The method of claim 14, wherein applying the at least one watermark template to the function further comprises adding, by the at least one computing device, the at least one watermark template to a graphical interface in association with the function requested to be performed.

17. The method of claim 14, wherein applying the at least one watermark template to the function further comprises adding, by the at least one computing device, metadata to a resource associated with the function of the at least one computing device.

18. The method of claim 14, wherein applying the at least one watermark template to the function further comprises adding, by the at least one computing device, a visual watermark to a header, a footer, or a body of a resource associated with the function.

19. The method of claim 14, wherein:
the function further comprises a microphone function; and
applying the at least one watermark template to the function further comprises applying, by the at least one computing device, an audio watermark to a microphone function by concatenating an audio resource with a configurable message.

20. The method of claim 14, further comprising creating, by the at least one computing device, at least one event log specifying a user identifier, a device identifier, a source identifier, a timestamp, a location, a determination of whether the at least one computing device complies with the compliance rule, or a combination thereof, associated with an application of the at least one watermark template to the function.

* * * * *